(12) United States Patent
Ikoma

(10) Patent No.: US 6,645,284 B2
(45) Date of Patent: Nov. 11, 2003

(54) INK COMPOSITION FOR WATER BASED BALLPOINT PEN

(75) Inventor: Hideyuki Ikoma, Yokohama (JP)

(73) Assignee: Mitsubishi Pencil Kabushiki Kaisha, Tokyo (JP)

(*) Notice: Subject to any disclaimer, the term of this patent is extended or adjusted under 35 U.S.C. 154(b) by 47 days.

(21) Appl. No.: 09/814,450

(22) Filed: Mar. 22, 2001

(65) Prior Publication Data

US 2001/0032567 A1 Oct. 25, 2001

(30) Foreign Application Priority Data

Mar. 27, 2000 (JP) ........................................ 2000-087315

(51) Int. Cl.[7] ............................................... C09D 11/00
(52) U.S. Cl. .................................. 106/31.58; 106/31.86
(58) Field of Search ............................ 106/31.58, 31.86

(56) References Cited

U.S. PATENT DOCUMENTS

| | | | | |
|---|---|---|---|---|
| 4,297,260 A | * | 10/1981 | Ferree et al. | ................. 523/161 |
| 4,471,079 A | * | 9/1984 | Enami | ......................... 401/209 |
| 4,647,310 A | * | 3/1987 | Shimada et al. | ......... 106/31.43 |
| 4,793,860 A | * | 12/1988 | Murakami et al. | ........ 106/31.43 |
| 5,877,235 A | * | 3/1999 | Sakuma et al. | .......... 106/31.58 |
| 5,990,201 A | * | 11/1999 | Miyazaki et al. | ......... 106/31.13 |
| 6,011,098 A | * | 1/2000 | Kashiwazaki et al. | ...... 524/270 |
| 6,048,914 A | * | 4/2000 | Goto et al. | ............... 106/31.57 |
| 6,258,873 B1 | * | 7/2001 | Gundlach et al. | ......... 106/31.43 |
| 6,274,645 B1 | * | 8/2001 | Gundlach et al. | ......... 106/31.43 |
| 6,432,184 B1 | * | 8/2002 | Malhotra et al. | ......... 106/31.43 |
| 6,454,846 B2 | * | 9/2002 | Yatake | ..................... 106/31.58 |
| 6,488,753 B1 | * | 12/2002 | Ito et al. | ..................... 106/31.9 |

FOREIGN PATENT DOCUMENTS

JP 04-183761 6/1992 ........... C09D/11/00

* cited by examiner

Primary Examiner—Mark L. Bell
Assistant Examiner—Veronica F. Faison
(74) Attorney, Agent, or Firm—Darby & Darby

(57) ABSTRACT

Provided is an ink composition for a water based ballpoint pen which satisfies all of no change in the ink composition even in storage over a long period of time, a good strike-through property and an excellent drawn line-drying property at the same time. An ink composition for a water based ballpoint pen comprising at least water and a colorant, characterized by further comprising at least one drawn line-drying property-improving agent selected from butyl cellosolve and butyl carbitol in a proportion of 0.1 to 2.5% by weight based on the whole amount of the composition and having a surface tension of 16 to 45 mN/m, and a water based ballpoint pen containing therein the same.

8 Claims, No Drawings

INK COMPOSITION FOR WATER BASED BALLPOINT PEN

BACKGROUND OF THE INVENTION

1. Field of the Invention

The present invention relates to an ink composition for a water based ballpoint pen which is improved in a drawn line-drying property and a water based ballpoint pen using the same.

2. Description of the Related Art

A drawn line-drying property of a water based ballpoint pen depends largely on a penetrability of the ink into paper, an evaporation-drying speed of the ink and an ink discharge amount per unit area. In particular, a level of the drawn line-drying property endowed is different according to the ink discharge amount per unit area, and an ink discharge amount (less than $4.5 \times 10^{-3}$ mg/mm$^2$) in writing with a water based ballpoint pen which has so far been usually used has made it possible to maintain a drawn line-drying property required in conventional inks without particularly trying to elevate a penetrability of the ink into paper and an evaporation-drying speed of the ink. However, when trying to make a ball diameter larger than $\phi$0.7 mm in order to obtain a thick line in a water based ballpoint pen or obtain a dense line, the ink discharge amount in writing has reached $4.5 \times 10^{-3}$ to $10.0 \times 10^{-3}$ mg/mm$^2$ in many cases, and it has been impossible to obtain a drawn line-drying property of such an extent as endurable in practical use without raising either of a penetrability of the ink into paper and an ink-drying speed.

However, in the case of a water based ballpoint pen, a rise in an evaporation-drying speed of the ink brings about a problem connecting directly with clogging of the ink at the pen tip caused by dry-up, and therefore it is not realistic to easily elevate the ink-drying speed. Further, it is considered to set a large clearance in the vicinity of a ball in a ballpoint pen tip as a countermeasure for clogging. In this method, however, new problems such as straight flow and blowing-off are caused in a certain case, and a tendency thereof is markedly shown particularly in a water based ballpoint pen using an ink having a low viscosity (1 to 10 mPa·s).

Accordingly, a method for elevating a penetrability of an ink into paper has so far usually been employed as a measure for obtaining a satisfactory drawn line-drying property. A method in which a large amount of a surfactant is added to an ink to reduce a surface tension of the ink has so far been taken as means for raising a penetrability of the ink into paper. In this case, however, feathering takes place a lot depending on the kind of a face of paper to be written, and a phenomenon in which an ink penetrates into a back side of a paper face (hereinafter called [strike-through]) is caused in many cases. Further, a surface tension of the ink to the ballpoint pen tip is reduced to a large extent, and a problem on quality (straight flow, blowing-off and the like) originating in a change in the environment in storage of the pen over a long period of time has so far been caused.

Further, it is considered to blend an ink with an alcohol base solvent having a relatively high surface tension such as cyclohexanol as a method for solving the problems described above. In this case, however, the ink blended therewith gives out an offensive smell which is intrinsic to an alcohol base solvent to lower a product value of the water based ballpoint pen, and a small solubility of the solvent into water is likely to deteriorate a solubility of the other components contained in the ink when moisture is evaporated from the pen tip during long-term storage or in opening the pen tip.

SUMMARY OF THE INVENTION

The present invention provides an ink composition for a water based ballpoint pen which satisfies all of no change in the ink composition even in storage over a long period of time, a good strike-through property and an excellent drawn line-drying property at the same time.

Intensive researches repeated by the present inventors in light of the existing situations described above have resulted in finding that the object described above can be achieved by blending an ink composition with a specific amount of a drawn line-drying property-improving agent comprising a specific compound, and they have completed the present invention based on this finding. That is, the present invention comprises the following items (1) to (5).

(1) An ink composition for a water based ballpoint pen comprising at least water and a colorant, characterized by further comprising at least one drawn line-drying property-improving agent selected from butyl cellosolve and butyl carbitol in a proportion of 0.1 to 2.5% by weight based on the whole amount of the composition and having a surface tension of 16 to 45 mN/m.

(2) The ink composition for a water based ballpoint pen as described in the above item (1), wherein the viscosity is 1 to 10 mPa·s (25° C.), and the surface tension is 25 to 45 mN/m.

(3) The ink composition for a water based ballpoint pen as described in the above item (1), characterized by having a viscosity of 100 to 4000 mPa·s (25° C.) at a shear rate of 3.84 s$^{1-}$ and a surface tension of 16 to 38 mN/m and having a pseudo-plasticity.

(4) The ink composition for a water based ballpoint pen as described in any of the above items (1) to (3), wherein a blending amount of a pigment as the colorant is 0.05 to 30% by weight based on the whole amount of the composition; 5.0 to 40.0% by weight of a water-soluble organic solvent based on the whole amount of the composition is further added; and the pH is 7.0 to 10.0.

(5) A water based ballpoint pen which contains the ink composition for a water based ballpoint pen as described in any of the above items (1) to (4) and is equipped with a ball tip having a ball diameter of exceeding 0.7 mm and 1.5 mm or less and which has an ink discharge amount per unit area of $4.5 \times 10^{-3}$ to $10.0 \times 10^{-3}$ mg/mm$^2$.

The water based ink composition of the present invention can maintain a quick drawn line-drying property and a high surface tension and therefore can hold a high writing level such as an inhibition in straight flow and blowing-off from the pen tip. It is such an excellent ink composition capable of satisfying all the performances described above that the strike-through resistance can be improved as well particularly in a water based ballpoint pen in which a ball having a ball diameter exceeding 0.7 mm is used to set a discharge amount of an ink so that it is $4.5 \times 10^{-3}$ to $10.0 \times 10^{-3}$ mg/mm$^2$.

DESCRIPTION OF THE PREFERRED EMBODIMENTS

Butyl cellosolve used as the drawn line-drying property-improving agent in the ink composition for a water based ballpoint pen of the present invention is a compound represented by the following chemical formula (I):

$$CH_3(CH_2)_3-OCH_2CH_2OH \qquad (I)$$

and butyl carbitol is a compound represented by the following chemical formula (II):

$$CH_3(CH_2)_3-(OCH_2CH_2)_2OH \quad (II)$$

Butyl cellosolve represented by the chemical formula (I) described above and butyl carbitol represented by the chemical formula (II) described above are publicly known substances. Butyl cellosolve can be synthesized by reacting ethylene oxide with 1-butanol under applied pressure, and butyl carbitol is obtained as a by-product thereof.

A blending amount of the drawn line-drying property-improving agent in the ink composition of the present invention can be set to 0.1 to 2.5% by weight, preferably 0.1 to 1.7% by weight and more preferably 0.5 to 1.0% by weight based on the whole amount of the composition. If it is less than 0.1% by weight, the satisfactory drawn line-drying property which is the object of the present invention is not obtained. On the other hand, if it exceeds 2.5% by weight, problems such as a reduction in the strike-through resistance and a surface tension of the ink are brought about, or when a pigment which is the colorant is a phthalocyanine base or a naphthol base, coagulation is caused, though a reason therefore is not clear, in the ink to make writing impossible in a certain case. This tendency is the case as well in other cellosolves and carbitols.

A blending amount of water in the ink composition of the present invention shall not specifically be restricted and is preferably 40 to 90% by weight based on the whole amount of the composition. The blending amount of less than 40% by weight allows the solvent and the colorant to grow relatively large and therefore makes the ink less liable to be volatilized, so that the ink is less liable to be dried in a certain case when written on paper. On the other hand, if the blending amount exceeds 90% by weight, the ink is liable to be volatilized, and the pen tip is dried, so that inferior writing is brought about in certain case.

The colorant used in the ink composition of the present invention includes a pigment or a water soluble dye. The kind of the pigment shall not specifically be restricted, and capable of being used are optional ones selected from inorganic base or organic base pigments which have so far been conventionally used for water based ink compositions.

The inorganic pigments include, for example, titanium oxide, carbon black, metal powder and the like.

The organic pigments include, for example, azo lakes, insoluble azo pigments, chelate azo pigments, phthalocyanine pigments, perylene and perynone pigments, anthraquinone pigments, quinacridone pigments, dye lakes, nitro pigments and nitroso pigments.

To be specific, examples thereof include phthalocyanine blue (C. I. 74160), phthalocyanine green (C. I. 74260), hansa yellow 3G (C. I. 11670), disazo yellow GR (C. I. 21100), naphthol red (C. I. 12390), permanent red 4R (C. I. 12335), brilliant carmin 6B (C. I. 15850) and quinacridone red (C. I. 46500).

Any of direct dyes, acid dyes, food colors and basic dyes can be used for the water-soluble dyes.

Examples of the direct dyes include C. I. Direct Black 17, ditto 19, ditto 22, ditto 32, ditto 38, ditto 51 and ditto 71, C. I. Direct Yellow 4, ditto 26, ditto 44 and ditto 50, C. I. Direct Red 1, ditto 4, ditto 23, ditto 31, ditto 37, ditto 39, ditto 75, ditto 80, ditto 81, ditto 83, ditto 225, ditto 226 and ditto 227, C. I. Direct Blue 1, ditto 15, ditto 71, ditto 86, ditto 106 and ditto 119.

Examples of the acid dyes include C. I. Acid Black 1, ditto 2, ditto 24, ditto 26, ditto 31, ditto 52, ditto 107, ditto 109, ditto 110, ditto 119 and ditto 154, C. I. Acid Yellow 7, ditto 17, ditto 19, ditto 23, ditto 25, ditto 29, ditto 38, ditto 42, ditto 49, ditto 61, ditto 72, ditto 78, ditto 110, ditto 141, ditto 127, ditto 135 and ditto 142, C. I. Acid Red 8, ditto 9, ditto 14, ditto 18, ditto 26, ditto 27, ditto 35, ditto 37, ditto 51, ditto 52, ditto 57, ditto 82, ditto 87, ditto 92, ditto 94, ditto 111, ditto 129, ditto 131, ditto 138, ditto 186, ditto 249, ditto 254, ditto 265 and ditto 276, C. I. Acid Violet 15 and ditto 17, C. I. Acid Blue 1, ditto 7, ditto 9, ditto 15, ditto 22, ditto 23, ditto 25, ditto 40, ditto 41, ditto 43, ditto 62, ditto 78, ditto 83, ditto 90, ditto 93, ditto 103, ditto 112, ditto 113, and ditto 158, C. I. Acid Green 3, ditto 9, ditto 16, ditto 25 and ditto 27.

A large part of the food colors is included in the direct dyes and the acid dyes, and examples of those which are not included therein include, for example, C. I. Food Yellow 3. Such dye can be used as the colorant of the present invention.

Examples of the basic dyes include, for example, C. I. Basic Yellow 1, ditto 2 and ditto 21, C. I. Basic Orange 2, ditto 14 and ditto 32, C. I. Basic Red 1, ditto 2, ditto 9 and ditto 14, C. I. Basic Violet 1, ditto 3 and ditto 7, C. I. Basic Green 4, C. I. Basic Brown 12, C. I. Basic Black 2 and ditto 8.

The dyes each may be used alone or in combination of two or more kinds thereof. A blending amount thereof falls usually in a range of 0.05 to 30% by weight, preferably 1 to 15% by weight based on the whole amount of the composition. If a blending amount of the colorant exceeds 30% by weight, the pigment is coagulated or the dye is deposited when stored over a long period of time, and it is clogged at the pen tip and causes inferior writing in a certain case. On the other hand, the blending amount of less than 0.05% by weight makes coloring poor and makes it impossible in a certain case to recognize the hue when written on paper. Also, it is preferred in the ink composition of the present invention that particularly when a pigment is used as the colorant, a blending amount of the pigment is 0.05 to 30% by weight based on the whole amount of the composition and that 5 to 40% by weight of a water-soluble organic solvent is blended as a moisture retention aid for preventing drying of the pen tip and the ink is controlled to a pH of 7 to 10.

The ink composition of the present invention can be blended, if necessary, with a water-soluble organic solvent as a moisture retention aid. Examples of the water-soluble organic solvent include water-soluble polyhydric alcohols such as ethylene glycol, diethylene glycol, propylene glycol and glycerin and glycol ether esters such as ethylene glycol monoethyl ether acetate. When using the water-soluble organic solvent, a blending amount thereof is preferably 5 to 40% by weight. If the blending amount is less than 5% by weight, a purpose for blending to prevent drying of the pen tip is not sufficiently achieved in a certain case, and if it exceeds 40% by weight, the drawn lines are less liable to be dried in a certain case.

The ink composition of the present invention can be blended, if necessary, with a dispersant, and particularly when a pigment is used as the colorant, a dispersant is preferably used. The dispersant has an action to adsorb on the surface of pigment particles to disperse the pigment in water, and capable of being usually used are nonionic or anionic surfactants, water-soluble high polymers and alkali-dissolving type amine base dispersants which are shown below.

Examples of the nonionic surfactants include polyoxyalkylene higher fatty acid esters, higher fatty acid esters of polyhydric alcohols and derivatives thereof, and higher fatty acid esters of sugar. To be more specific, capable of being given are, for example, fatty acid esters of glycerin, polyglycerin fatty acid esters, propylene glycol fatty acid esters, pentaerythritol fatty acid esters, polyoxyethylene sorbitan fatty acid esters, polyoxyethylene sorbit fatty acid esters, polyoxyethylene glycerin fatty acid esters, polyethylene glycol fatty acid esters, polyoxyethylene alkyl ethers, polyoxyethylene phytosterols, polyoxyethylene polyoxypropylene alkyl ethers, polyoxyethylene alkylphenyl ethers, polyoxyethylene castor oil, polyoxyethylene lanolin, polyoxyethylene lanolin alcohols, polyoxyethylene alkylamines, polyoxyethylene fatty acid amides and polyoxyethylene alkylphenyl formaldehyde condensation products.

Examples of the anionic surfactants include alkylated sulfonates of higher fatty acid amides and alkylallylsulfonates. To be more specific, capable of being given are, for example, alkylsulfates, polyoxyethylene alkyl ether sulfates, N-acylamino acid salts, N-acylmethyltaurine salts, polyoxyethylene alkyl ether acetates, alkylphosphates and polyoxyethylene alkyl ether phosphates.

The water soluble high polymer has a function as a binder and is provided with a property to improve a dispersion stability of a pigment in a pigment ink, and therefore it is preferably used in the present invention. Examples thereof include polyacrylic acids, acrylic acid copolymers and maleic acid resins. To be more specific, capable of being given are, for example, those obtained by turning resins such as an acrylic acid resin, a styrene-acryl resin and a styrene-maleic acid resin into salt forms to make them water soluble. Alkaline metals for forming the salts includes, for example, sodium and potassium.

Capable of being given as the alkali-dissolving type amine base dispersants are, for example, aliphatic primary to tertiary amines such as mono-, di- or tri-methylamine and alcoholamines such as mono-, di- or tri-propanolamine, methylethanolamine, methylpropanolamine and dimethylethanolamine. Capable of being given as the other dispersants are, for example, ammonia, morpholine and N-methylmorpholine.

When using the dispersant, a blending amount thereof is preferably 0.1 to 10% by weight based on the whole amount of the composition.

A surface tension of the ink composition of the present invention is suitably set preferably in a range of about 16 to about 45 mN/m (measuring temperature: 25° C., measuring meter: a surface tension measuring meter manufactured by Kyowa Interface Science Co., Ltd.). For example, when the ink composition of the present invention is used for a ballpoint pen of a direct storage, direct ink-feed system which shall be described later as a low viscosity ink having a viscosity of not much more than 1 to 10 mPa·s (25° C.), a surface tension of the ink is controlled preferably to about 35 to about 45 mN/m, more preferably 37 to 42 mN/m and desirably 38 to 40 mN/m in order to maintain the quality of the ballpoint pen. Also, when it is used for a ballpoint pen of a sliver system having the same viscosity which shall be described later, a surface tension of the ink is controlled preferably to 25 to 40 mN/m, more preferably 27 to 38 mN/m and desirably 30 to 36 mN/m. If the surface tensions of the inks are lower than the preferred ranges described above respectively in the ballpoint pens of the above respective systems, the drawn lines are liable to cause feathering, and adverse effects (straight flow, blowing-off and the like) are exerted on a quality of the ballpoint pens in a certain case. On the other hand, if the surface tensions exceed the preferred ranges described above respectively, a writing feeling and a flow amount stability of the ballpoint pens are reduced in a certain case.

On the other hand, when the ink composition of the present invention is provided with pseudo-plasticity to prepare an intermediate viscosity ink having a viscosity of not much more than 100 to 4000 mPa·s (25° C.) at a shearing rate of $3.84\,s^{-1}$, a surface tension thereof is controlled so that it falls preferably in a range of 16 to 38 mN/m, more preferably 17 to 35 mN/m and desirably 20 to 33 mN/m. If the surface tension is less than 16 mN/m, a straight flow phenomenon is liable to be caused, and coagulation and settling of the pigment are liable to be brought about. On the other hand, if it exceeds 38 mN/m, a blobbing phenomenon and a splitting phenomenon are liable to be caused. Further, a discharge amount of the ink turns instable depending on a storing environment and a writing state to bring about scattering in a density and a width of the drawn lines.

A surface tension of the composition can be controlled by blending amounts of the surfactant, the drying property-improving agent and the like. However, addition of a surfactant in order to maintain the writing feeling at a satisfactory level markedly reduces the surface tension. It is a very important means for elevating a drawn line-drying property of such ink to use additives such as butyl cellosolve and/or butyl carbitol which do not reduce the surface tension so much and can, in addition thereto, raise the drawn line-drying property.

A viscosity of the ink composition of the present invention can be selected from a range of 1 to 4000 mPa·s (measuring temperature: 25° C., measuring meter: an ELD type viscometer manufactured by Tokyo Keiki Co., Ltd.), and as described later, the optimum viscosity range can suitably be set according to the system of the ballpoint pen used.

For example, a low viscosity ink having a viscosity of 1 to 10 mPa·s (measuring temperature: 25° C., measuring meter: an ELD type viscometer manufactured by Tokyo Keiki Co., Ltd.) can be prepared from the ink composition of the present invention. When the ink composition of the present invention is provided with pseudo-plasticity, the ink viscosity at a shearing rate of $3.84\,s^{-1}$ is controlled preferably to 100 to 4000 mPa·s (measuring temperature: 25° C., measuring meter: an ELD type viscometer manufactured by Tokyo Keiki Co., Ltd.), more preferably 200 to 2000 mPa·s and desirably 300 to 1000 mPa·s. In this case, if a viscosity of the ink is lower than 100 mPa·s, the ink trickles down in drops from the pen tip in a certain case. Further, when using a colorant having a large specific gravity such as titanium dioxide, the viscosity has to be controlled to a higher level in order to prevent the colorant from settling down. Also in such case, however, a viscosity of the ink exceeding 4000 mPa·s is likely to bring about a reduction in the writing property due to an inferior followability of the ink, so that the upper limit thereof is preferably set to not much higher than 4000 mPa·s.

A viscosity of the ink composition of the present invention can be controlled by, for example, a blending amount of a water-soluble organic solvent, a resin emulsion and a thickener.

In the ink composition of the present invention, the pH is preferably controlled to 7 to 10 for the purposes of preventing the metal ball pen tip from rusting and preventing the dispersant for the pigment from coagulating (measuring temperature: 25° C., measuring meter: a pH meter manufactured by Horiba Co., Ltd.). In particular, when a dispersant of an alkali-dissolving type is used as the dispersant, the effects thereof can sufficiently be exhibited by controlling the pH in the range described above.

In addition to the components described above, capable of being blended are components such as, for example, lubricants, preservatives, pH controlling agents, thickeners, corrosion inhibitors and resin emulsions.

Capable of being given as the lubricants are, for example, fatty acid salts such as potassium linoleate, sodium ricinoleate, potassium oleate and sodium oleate and in addition thereto, the preceding surfactants given as the dispersants.

Capable of being given as the preservatives are, for example, phenol, isopropylmethylphenol, sodium pentachlorophenol, benzoic acid, sodium benzoate, dehydroacetic acid, sodium dehydroacetate, sorbic acid, potassium sorbate, 2-pyridinethiol-1-oxide sodium salt, 1,2-benzisothiazoline-3-one, 5-chloro-2-methyl-4-isothiazoline-3-one, 2,4-thiazolinebenzimidazole and paraoxybenzoic acid esters.

Capable of being given as the pH controlling agents are amines or bases, for example, various organic amines such as aminomethylpropanol, triethanolamine, monoethanolamine and diethanolamine, inorganic alkali agents of alkaline metal hydroxides such as sodium hydroxide, lithium hydroxide and potassium hydroxide, and ammonia.

The thickeners are classified largely into organic thickeners and inorganic thickeners, and acryl base synthetic high polymers, natural gums, celluloses and polysaccharides can be used as the organic thickeners. To be more specific, they include, for example, gum arabic, tragacanth gum, guar gum, locust bean gum, alginic acid, carrageenan, gelatin, casein, xanthane gum, dextran, methyl cellulose, ethyl cellulose, hydroxyethyl cellulose, carboxymethyl cellulose, starch sodium glycolate, alginic acid propylene glycol esters, polyvinyl alcohol, polyvinylpyrrolidone, polyvinyl methyl ether, poly(sodium acrylate), carboxyvinyl polymers, polyethylene oxides, cross-linking type acrylic acid polymers, copolymers of vinyl acetate and polyvinylpyrrolidone, and salts of styrene-acrylic acid copolymers. The inorganic thickeners include, for example, fine particles of clays such as smectite, bentonite and diatomaceous earth and silicon dioxide.

A blending amount of these thickeners shall be increased or decreased according to a viscosity value of the ink.

The corrosion inhibitors include, for example, tolyl triazole, benzotriazole and derivatives thereof, aliphatic phosphate derivatives such as octyl phosphate and dioctyl thiophosphate, imidazole, benzimidazole and derivatives thereof, 2-mercaptobenzothiazole, octyl methanesulfonate, dicyclohexylammonium nitrite, diisopropylammonium nitrite, propargyl alcohol and dialkylthiourea.

The resin emulsion is blended expecting a function principally as a viscosity-controlling agent or a visibility-improving agent from an opaque feeling thereof and includes, for example, polyvinyl chloride, polyvinylidene chloride, polystyrene, polyethylene, polycarbonate, polymethyl methacrylate, benzoquanamine resins, styrene-acrylonitrile copolymers, modified acryl methyl methacrylate-styrene copolymers, acrylic alkyl ester copolymers, acrylonitrile-acrylic alkyl ester copolymers, styrene-acrylic alkyl ester copolymers, styrene-methacrylic alkyl ester-acrylic alkyl ester copolymers, styrene-acrylonitrile-acrylic alkyl ester copolymers, styrene-acrylonitrile-methacrylic alkyl ester-acrylic alkyl ester copolymers, methacrylic alkyl ester-acrylic alkyl ester copolymers, acrylic acid-methacrylic acid-acrylic alkyl ester copolymers and vinylidene chloride-acrylic alkyl ester copolymers.

The ink composition of the present invention can be produced by stirring and mixing the components described above according to a conventional method.

Capable of being employed as the ballpoint pen of the present invention is a structure comprising an ink reservoir containing the ink composition described above, a tip holder comprising a material such as stainless steel, brass, german silver and a resin and a pen tip having a ball comprising a material such as sintered hard metal, zirconia and silicon carbide.

The water based ink composition of the present invention having an ink viscosity of not much more than 1 to 10 mPa·s is suitably used for a ballpoint pen of a sliver system and a ballpoint pen of a direct ink-feed system in which an ink is stored directly into the ballpoint pen. The composition having an ink viscosity of not much more than 100 to 4000 mPa·s at a shearing rate of 3.84 s$^{-1}$ is suitably used principally for a ballpoint pen of a storage, direct ink-feed system. In this case, the ballpoint pen of a sliver system is a ballpoint pen constituted from a barrel storing therein a sliver which absorbs the ink of the present invention described above, a feed comprising a fiber bundle which is connected to the sliver and a pen tip comprising a ball and a tip holder. The ballpoint pen of a direct ink-feed system includes two kinds, and the ballpoint pen of a direct storage, direct ink-feed system is a ballpoint pen constituted from an ink tank in which an ink is directly stored, an ink-holding member (collector) in which the ink pushed out from the ink tank when air contained in the ink tank is expanded by a rise in the temperature is temporarily held so that the ink is prevented from trickling down in drops and a pen tip comprising a ball and a tip holder. The ballpoint pen of a storage, direct ink-feed system is a ballpoint pen constituted from a tube in which the ink is directly stored and a pen tip comprising a ball and a tip holder.

Among the ballpoint pens of a direct ink-feed system described above, the ballpoint pen of a storage, direct ink-feed system does not have an ink-holding member (buffering part) in which the ink is temporarily held, so that a discharge amount of the ink tends to inevitably grow large. In this case, a discharge amount of the ink is suppressed by suitably setting a clearance between a ball and a tip, or the discharge amount can be set by adding a pseudo-plasticizing agent to the ink to thereby provide the ink with a viscosity-reduced-by-shearing property.

The ink composition of the present invention displays particularly excellent effects when it is controlled so that the viscosity becomes 1 to 10 mPa·s (measuring temperature: 25° C., measuring meter: an ELD type viscometer manufactured by Tokyo Keiki Co., Ltd.) and then applied to a water based ballpoint pen equipped with a ball tip having an ink discharge amount per unit area of $4.5 \times 10^{-3}$ to $10.0 \times 10^{-3}$ mg/mm$^2$ and a ball diameter of exceeding 0.7 mm and 1.5 mm or less.

That is, a ballpoint pen using an ink having the viscosity range described above includes the sliver type water based ballpoint pen and the water based ballpoint pen of a direct storage, direct ink-feed system each described above. When having a purpose to obtain thick drawn lines, the ballpoint pens of such types have to use a ball tip having a ball diameter of exceeding 0.7 mm and 1.5 mm or less as a means therefor to set the ink discharge amount per unit area to $4.5 \times 10^{-3}$ to $10.0 \times 10^{-3}$ mg/mm$^2$. The characteristics such as an excellent drying property of the drawn lines and the smooth writing feeling originating in a lubricity brought by the ink discharge amount are more effectively drawn out by applying the ink of the present invention to the ballpoint pens which are set in such manner as described above.

It is a matter of course that the ink composition of the present invention can be applied to water based ballpoint pens other than those described above.

An action mechanism in which a drawn line-drying property is elevated in the ink composition of the present invention is not yet apparent, but it is estimated that butyl cellosolve and butyl carbitol which are used in the present invention are excellent in a wetting property to paper as compared with other water-soluble organic solvents, so that this property contributes to a rise in the drawn line-drying property. A drawn line-drying property-improving action exhibited when butyl cellosolve and butyl carbitol are blended into an ink in a specific proportion is a knowledge which has been found for the first time in the present invention.

EXAMPLES

Next, the present invention shall more specifically be explained with reference to examples, but the present invention shall by no mean be restricted by them.

Example 1

The following components were stirred and mixed for 3 hours by means of a stirrer and then dispersed for 5 hours by means of a sand mill, and further, coarse particles were removed by means of a centrifugal separator, whereby a black water based pigment ink for a ballpoint pen was prepared.

| Components | blending amount: % by weight |
|---|---|
| Pigment: carbon black | 8.0 |
| (Carbon Black MA100: manufactured by | |
| Mitsubishi Chemical Co., Ltd.) | |
| Solvent: glycerin | 5.0 |
| Solvent: propylene glycol | 6.0 |
| Solvent: diethylene glycol | 6.0 |
| Dispersant: styrene-acrylic acid resin ammonium salt | 3.0 |
| Lubricant: nonionic surfactant | 0.3 |
| (Scorol 700: manufactured by Kao Corporation) | |
| pH controlling agent: aminomethylpropanol | 0.2 |
| Preservative: 1,2 benzisothiazoline-3-one (Proxel BDN: manufactured by Zeneka Co., Ltd.) | 0.1 |
| Rust preventive: benzotriazole | 0.1 |
| Drawn line drying-improving agent: butyl carbitol | 2.0 |
| Purified water | balance |

Comparative Example 1

An ink was prepared in the same manner as in Example 1, except that butyl carbitol was removed.

Comparative Example 2

An ink was prepared in the same manner as in Example 1, except that an addition amount of butyl carbitol was increased to 10.0% by weight.

Example 2

A blue water based pigment ink for a ballpoint pen was prepared by the same method as in Example 1 according to the following composition.

| Components | blending amount: % by weight |
|---|---|
| Pigment: phthalocyanine blue | 8.0 |
| (Chrimofine Blue 4965: manufactured by | |
| Dainichiseika Color & Chemicals MFG. Co., Ltd.) | |
| Solvent: glycerin | 8.0 |
| Solvent: propylene glycol | 1.0 |
| Solvent: diethylene glycol | 8.0 |
| Dispersant: styrene-acrylic acid resin ammonium salt | 3.0 |
| Lubricant: nonionic surfactant | 0.1 |
| (Scorol 700: manufactured by Kao Corporation) | |
| pH controlling agent: aminomethylpropanol | 0.2 |
| Preservative: 1,2 benzisothiazoline-3-one (Proxel BDN: manufactured by Zeneka Co., Ltd.) | 0.1 |
| Rust preventive: benzotriazole | 0.1 |
| Drawn line drying-improving agent: butyl cellosolve | 1.5 |
| Purified water | balance |

Comparative Example 3

An ink was prepared in the same manner as in Example 2, except that butyl cellosolve was removed.

Comparative Example 4

An ink was prepared in the same manner as in Example 2, except that an addition amount of butyl cellosolve was increased to 10.0% by weight.

Example 3

A red water based pigment ink for a ballpoint pen was prepared by the same method as in Example 1 according to the following composition.

| Components | blending amount: % by weight |
|---|---|
| Pigment: naphthol red | 8.0 |
| (Sumitone Scarlet: manufactured by | |
| Sumitomo Chemical Ind. Co., Ltd.) | |
| Solvent: glycerin | 5.0 |
| Solvent: propylene glycol | 3.0 |
| Solvent: diethylene glycol | 8.0 |
| Dispersant: styrene-acrylic acid resin ammonium salt | 3.0 |
| Lubricant: nonionic surfactant | 0.1 |
| (Scorol 700: manufactured by Kao Corporation) | |
| pH controlling agent: aminomethylpropanol | 0.2 |
| Preservative: 1,2 benzisothiazoline-3-one (Proxel BDN: manufactured by Zeneka Co., Ltd.) | 0.1 |
| Rust preventive: benzotriazole | 0.1 |
| Drawn line drying-improving agent: butyl carbitol | 1.5 |
| Purified water | balance |

Comparative Example 5

An ink was prepared in the same manner as in Example 3, except that butyl carbitol was removed.

Comparative Example 6

An ink was prepared in the same manner as in Example 3, except that an addition amount of butyl carbitol was increased to 10.0% by weight.

Example 4

The following respective components were stirred at a room temperature for 3 to 4 hours and then filtered to prepare a red water based pigment ink for a ballpoint pen.

| Components | blending amount: % by weight |
|---|---|
| Dye: eosin (C. I. Acid Red 87) | 8.0 |
| Solvent: glycerin | 20.0 |
| Lubricant: nonionic surfactant (Scorol 900: manufactured by Kao Corporation) | 0.1 |
| pH controlling agent: aminomethylpropanol | 0.2 |
| Preservative: 1,2 benzisothiazoline-3-one (Proxel BDN: manufactured by Zeneka Co., Ltd.) | 0.1 |
| Rust preventive: benzotriazole | 0.1 |
| Visibility-improving agent: polystyrene emulsion (C-10: manufactured by Showa HighPolymer Co., Ltd.) | 15.0 |
| Drawn line drying-improving agent: butyl carbitol | 1.5 |
| Purified water | balance |

Comparative Example 7

An ink was prepared in the same manner as in Example 4, except that butyl carbitol was removed.

Comparative Example 8

An ink was prepared in the same manner as in Example 4, except that an addition amount of butyl carbitol was increased to 10.0% by weight.

Example 5

A blue water based pigment ink for a ballpoint pen was prepared by the same method as in Example 1 according to the following composition.

| Components | blending amount: % by weight |
|---|---|
| Pigment: phthalocyanine blue (Chrimofine Blue 4965: manufactured by Dainichiseika Color & Chemicals MFG. Co., Ltd.) | 8.0 |
| Solvent: ethylene glycol | 20.0 |
| Dispersant: styrene-acrylic acid resin ammonium salt | 3.0 |
| Lubricant: nonionic surfactant (Scorol 700: manufactured by Kao Corporation) | 0.7 |
| pH controlling agent: aminomethylpropanol | 0.5 |
| Thickener: acryl base synthetic high polymer | 0.4 |
| Rust preventive: benzotriazole | 0.2 |
| Drawn line drying-improving agent: butyl carbitol | 2.0 |
| Purified water | balance |

Comparative Example 9

An ink was prepared in the same manner as in Example 5, except that butyl carbitol was removed.

Comparative Example 10

An ink was prepared in the same manner as in Example 5, except that an addition amount of butyl carbitol was increased to 10.0% by weight.

Comparative Example 11

An ink was prepared in the same manner as in Example 1, except that 2.0% by weight methyl carbitol was substituted for butyl carbitol.

Example 6

The ink prepared in Example 1 was charged into an ink tank of a direct storage system to produce a water based ballpoint pen equipped with a pen tip which was assembled using a ball having a diameter of ϕ0.7 mm and a tip holder. The pen was used to carry out a drawn line evaluation test and a strike-through test which shall be described later.

Test example

The inks obtained in the examples and comparative examples each described above were evaluated according to the following drawn line-drying property test and drawn line strike-through test. The results thereof are shown in Table 1.

Drawn line-drying property test:

Ballpoint pens of the following specifications were charged with the inks prepared in the examples and comparative examples and assembled.

(1) Direct storage system ballpoint pen (ball diameter: ϕ1.0)

Examples 1, 2 and 4

Comparative Examples 1, 2, 3, 4, 7, 8 and 11

(2) Sliver system ballpoint pen (ball diameter:ϕ1.0)

Example 3

Comparative Examples 5 and 6

(3) Storage system ballpoint pen (ball diameter:ϕ1.0)

Examples 5

Comparative Examples 9 and 10

(4) Direct storage system ballpoint pen (ball diameter: ϕ0.7)

Example 6

Then, a sheet prescribed in ISO 14145-1 was used for a test paper to write spirals in 7 rounds with a hand, and the paper face was rubbed with a finger immediately after writing, 3 seconds and 5 seconds after writing to evaluate a stain state thereof according to the following criteria.

Judge Criteria:

◯: no stain caused by drawn lines on paper face

Δ: stain caused by drawn lines on paper face is observed a little

X: stain is observed in a great part of drawn lines on paper face

Drawn Line Strike-Through Test:

After carrying out the test described above, the back side of the writing face was observed to evaluate whether or not the drawn lines were struck through according to the following criteria.

Judge Criteria:

◯: no strike-through

Δ: a little strike-through can be confirmed

X: a great part of drawn lines is struck through

TABLE 1

| | Ink discharge amount (mg/mm$^2$) | Drawn line-drying property test | | | Strike-through test | pH | Ink physical properties | |
|---|---|---|---|---|---|---|---|---|
| | | Immediately after | 3 seconds later | 5 seconds later | | | Viscosity (mPa·s) | Surface tension (mN/m) |
| Example 1 | 5.1 × 10$^{-3}$ | Δ | ○ | ○ | ○ | 8.5 | 3.4 | 39.6 |
| Example 2 | 5.1 × 10$^{-3}$ | Δ | ○ | ○ | ○ | 8.6 | 3.3 | 39.8 |
| Example 3 | 4.6 × 10$^{-3}$ | Δ | ○ | ○ | ○ | 8.7 | 3.6 | 35.8 |
| Example 4 | 5.1 × 10$^{-3}$ | Δ | ○ | ○ | ○ | 9.2 | 3.8 | 41.7 |
| Example 5 | 8.2 × 10$^{-3}$ | Δ | ○ | ○ | ○ | 8.5 | 755$^{(*1)}$ | 33.7 |
| Comparative Example 1 | 5.0 × 10$^{-3}$ | X | X | X | ○ | 8.4 | 3.1 | 44.3 |
| Comparative Example 2 | 5.2 × 10$^{-3}$ | ○ | ○ | ○ | X | 8.3 | 6.1 | 33.4 |
| Comparative Example 3 | 5.0 × 10$^{-3}$ | X | X | X | ○ | 8.5 | 3.0 | 43.5 |
| Comparative Example 4 | *2 | — | — | — | — | — | — | — |
| Comparative Example 5 | 4.5 × 10$^{-3}$ | X | X | X | ○ | 8.7 | 3.2 | 39.6 |
| Comparative Example 6 | *2 | — | — | — | — | — | — | — |
| Comparative Example 7 | 5.0 × 10$^{-3}$ | X | X | X | ○ | 9.3 | 3.3 | 45.1 |
| Comparative Example 8 | 5.2 × 10$^{-3}$ | ○ | ○ | ○ | X | 9.2 | 5.9 | 34.3 |
| Comparative Example 9 | 8.1 × 10$^{-3}$ | X | X | X | ○ | 8.3 | 730$^{(*1)}$ | 38.4 |
| Comparative Example 10 | *2 | — | — | — | — | — | — | — |
| Comparative Example 11 | 5.0 × 10$^{-3}$ | X | X | X | ○ | 8.4 | 3.3 | 43.5 |
| Example 6 | 4.3 × 10$^{-3}$ | ○ | ○ | ○ | ○ | 8.5 | 3.4 | 39.6 |

$^{(*1)}$Ink viscosity at a shearing rate of 3.84 s$^{-1}$
*2: Pigment is coagulated and writing is impossible As apparent from the results of the respective examples and comparative examples described above, the water based ink for a ballpoint pen of the present invention which is blended with a drawn line-drying property-improving agent comprising at least one of butyl cellosolve and butyl carbitol makes it possible to maintain a surface tension of the ink at about 25 to 45 mN/m and can be improved in a drawn line-drying property without causing strike-through. Also, it has been able to be confirmed that when the ink discharge amount is large, the effects are particularly exhibited.

Further, the compositions prepared in the examples and comparative examples described above were charged into the ballpoint pens of the respective systems in optional combinations other than those described above to carry out the same experiments, and as a result thereof, the same tendency was shown in all cases. The ballpoint pens having a ball diameter of 1.0 mm prepared in Examples 1 to 5 were more effective in characteristics such as a smooth writing feeling originating in a lubricity brought by the ink discharge amount than the ballpoint pen having a ball diameter of 0.7 mm prepared in Example 6.

What is claimed is:

1. An ink composition for a water based ballpoint pen comprising at least water and a colorant, said ink composition characterized by further comprising at least one drawn line-drying property-improving agent selected from the group consisting of butyl cellosolve and butyl carbitol in a proportion of 0.1 to 2.5% by weight based on the total amount of the composition and having a viscosity of 1 to 10 mPa·s (25° C.) and a surface tension of 25 to 45 mN/m.

2. An ink composition for a water based ballpoint pen comprising at least water and a colorant, said ink composition characterized by further comprising at feast one drawn line-drying property-improving agent selected from the group consisting of butyl cellosolve and butly carbitol in a proportion of 0.1 to 2.5% by weight based on the total amount of the composition and having a viscosity of 300 to 4000 mPa·s (25° C.) at a shear rate of 3.84 s$^{-1}$ and a surface tension of 16 to 38 mN/m and having a pseudo-plasticity.

3. The ink composition for a water based ballpoint pen as described in claim 1, wherein a blending amount of a pigment as the colorant is 0.05 to 30% by weight based on the total amount of the composition; 5.0 to 40.0% by weight of a water-soluble organic solvent based on the total amount of the composition is further added; and the pH is 7.0 to 10.0.

4. The ink composition for a water based ballpoint pen as described in claim 2, wherein a blending amount of a pigment as the colorant is 0.05 to 30% by weight based on the total amount of the composition; 5.0 to 40.0% by weight of a water-soluble organic solvent based on the total amount of the composition is further added; and the pH is 7.0 to 10.0.

5. A water based ballpoint pen containing an ink composition comprising at least water and a colorant, said ink composition further comprising at least one drawn line-drying property-improving agent selected from the group consisting of butyl cellosolve an butyl carbitol in a proportion of 0.1 to 2.5% by weight based on the total amount of the composition and having a viscosity is 1 to 10 mPa's (25C), and a surface tension of 25 to 45 mN/m, the pen being equipped with a ball tip having a ball diameter of exceeding 0.7 mm and 1.5 mm or less and which has an ink discharge amount per unit area of 4.5×10$^{-3}$ to 10.0×10$^{-3}$ mg/mm$^2$.

6. A water based ballpoint pen containing an ink composition for a water based ballpoint pen comprising at least water and a colorant, said ink composition characterized by further comprising at least one drawn line-drying property-improving agent selected from the group consisting of butyl cellosolve and butyl carbitol in a proportion of 0.1 to 2.5% by weight based on the total amount of the composition and having a viscosity of 300 to 4000 mPa·s (25° C.) at a shear rate of 3.84 s$^{-1}$ and a surface tension of 16 to 38 mN/m and having a pseudo-plasticity, the pen being equipped with a ball tip having a ball diameter of exceeding 0.7 mm and 1.5 mm or less and which has an ink discharge amount per unit area of $4.5 \times 10^{-3}$ to $10.0 \times 10^{-3}$ mg/mm$^2$.

7. A water based ballpoint pen as described in claim 5, containing the ink composition, wherein a blending amount of a pigment as the colorant is 0.05 to 30% by weight based on the total amount of the composition; 5.0 to 40.0% by weight of a water-soluble organic solvent based on the total amount of the composition is further added; and the pH is 7.0 to 10.0, the pen being equipped with a ball tip having a ball diameter of exceeding 0.7 mm and 1.5 mm or less and which has an ink discharge amount per unit area of $4.5 \times 10^{-3}$ to $10.0 \times 10^{-3}$ mg/mm$^2$.

8. A water based ballpoint pen as described in claim 6, containing the ink composition, wherein a blending amount of a pigment as the colorant is 0.05 to 30% by weight based on the total amount of the composition; 5.0 to 40.0% by weight of a water-soluble organic solvent based on the total amount of the composition is further added; and the pH is 7.0 to 10.0, the pen being equipped with a ball tip having a ball diameter of exceeding 0.7 mm and 1.5 mm or less and which has an ink discharge amount per unit area of $4.5 \times 10^{-3}$ to $10.0 \times 10^{-3}$ mg/mm$^2$.

* * * * *